United States Patent [19]
Cooper

[11] Patent Number: 5,751,368
[45] Date of Patent: *May 12, 1998

[54] DELAY DETECTOR APPARATUS AND METHOD FOR MULTIPLE VIDEO SOURCES

[75] Inventor: J. Carl Cooper, Monte Sereno, Calif.

[73] Assignee: Pixel Instruments Corp., Los Gatos, Calif.

[*] Notice: The term of this patent shall not extend beyond the expiration date of Pat. No. 5,530,483.

[21] Appl. No.: 651,191

[22] Filed: May 17, 1996

Related U.S. Application Data

[63] Continuation-in-part of Ser. No. 321,280, Oct. 11, 1994, Pat. No. 5,530,483.

[51] Int. Cl.[6] .................................................. H04N 9/475
[52] U.S. Cl. .......................... 348/512; 348/129; 348/518; 348/914; 382/209; 382/218
[58] Field of Search .................... 348/97, 129, 192, 348/512, 518, 422, 615, 914, 519, 584; 371/62, 65, 57.1; 382/107, 209, 217, 218, 236, 278; H04N 17/08, 9/475

[56] References Cited

U.S. PATENT DOCUMENTS

| | | | |
|---|---|---|---|
| Re. 33,535 | 2/1991 | Cooper | 358/149 |
| 3,824,340 | 7/1974 | Sensney | 348/519 |
| 4,214,261 | 7/1980 | Bazin et al. | 348/519 |
| 4,313,135 | 1/1982 | Cooper | 358/149 |
| 4,611,347 | 9/1986 | Netravali et al. | 382/47 |
| 4,963,030 | 10/1990 | Makur | 348/442 |
| 5,068,723 | 11/1991 | Dixit et al. | 348/442 |
| 5,387,943 | 2/1995 | Silver | 348/518 |
| 5,530,483 | 6/1996 | Cooper et al. | 348/192 |

*Primary Examiner*—John K. Peng
*Assistant Examiner*—Jeffrey S. Murrell
*Attorney, Agent, or Firm*—J. Carl Cooper

[57] ABSTRACT

The apparatus and method described herein shows a system of determining the delay of a delayed version of a sequence of images with respect to a relatively undelayed version in a system which creates an output image signal from a plurality of input signals. The invention is also useful for comparing a given image to other images to determine the closest match, and thus the one of the plurality of input image sources from which an output image is taken.

31 Claims, 3 Drawing Sheets

DELAY DETECTOR APPARATUS AND METHOD FOR MULTIPLE VIDEO SOURCES

RELATED APPLICATION

The present invention is a continuation in part of the application Ser. No. 08/321,280, filed Oct. 11, 1994 now U.S. Pat. No. 5,530,483, issued Jun. 25, 1996, which application is incorporated herein by reference, as fully and completely and for all purposes, as if it had been set forth in detail in the present specification.

BACKGROUND OF THE INVENTION

The invention relates to the measurement of delays of sequences of images such as film and video type signals in order to provide a measure of quality of image processing device or to provide compensation processing of associated signals. In particular as multiple video like signals are subjected to switching, combining and/or processing which delay the signals by delays which can change slowly or instantaneously it is desirable to identify which source the output video signal came from, to measure the delay the output signal experiences, or a particular one or ones of the input signals undergoes. The measure of delay may be used to modify the processing or transmission of the video like signal or an associated signal to keep the delay to a minimum, to delay corresponding signals by a corresponding amount to preserve mutual synchronization, or for other purposes as will become known to one skilled in the art from the teachings herein.

1. Field of the Invention

The field of the invention includes processing multiple ones of sequences of images such as television video signals, compressed or encoded image signals, motion picture film and the like by various electronic, optical and mechanical devices, which processing adds a delay to the signals. Since these image sequences are often utilized in conjunction with other sequences of events or signals, the delays which are imparted cause synchronization problems with the need to correct other signals accordingly, or otherwise to minimize the delay. Of particular interest are television programs consisting of a video signal in analog, digital, compressed or encoded form and one or more associated signal such as the audio signals; where the video signal is composed of portions derived from multiple signals from multiple sources. The delay of the resultant video signal without delay of the corresponding audio signal creates a corresponding lip sync error which can be most annoying to the television program viewer. The problem is compounded when the television program is made up from multiple sources such that the delay of the currently output source is instantly changed when the source or the processing of the source is changed.

The image sequences may be conveyed in raster scan, bit mapped, compressed or any other of the various forms or formats which are well known in the art on electronic, magnetic, optical or other of the various well known storage, distribution and transmission methods.

2. Description of the Prior Art

In the motion picture film industry it is known to measure the speed of film frames or sprocket holes past a given point to synchronize the film to sound recordings.

Several video processing devices utilize internal circuitry to determine the delay of the video signal through the device, taking into account the circuitry or memory in use at a particular time, but without resort to any information carried with the video signal.

U.S. Pat. No. 5,387,943 to Silver shows how to semiautomatically measure the relative timing between some types of lip movements in a television video signal and pauses in the associated audio signal, but does not provide a measurement of the video delay through a video system. Silver further requires operator intervention to identify the presence and location of lips in the video signal.

U.S. Pat. No. 4,313,135 describes an audio to video synchronization apparatus and method with a method of detecting the delay of a video signal by comparing the relatively delayed and undelayed signals in a phase locked loop type circuit coupled with a video correlator (16 of FIG. 2). The correlator performs a correlation of the delayed and undelayed video to determine if the same frame of a current (undelayed) and previous (delayed) signal are being applied to the inputs.

The '135 correlator operates such that each signal, delayed and undelayed, is sampled and the sample value stored as in a sample and hold circuit, at the center of several active video lines. The line samples are subtracted, i.e. the sample from line number X from input (undelayed) video is subtracted from the sample from X of output (delayed) video, the absolute value of the difference being a measure of the correlation or matching of the lines. The absolute value of the differences for a number of lines is averaged thus giving a voltage which is proportional to the correlation between the delayed and undelayed video signals. If the undelayed and delayed video signal present the same image frame during the frame period they will match, thus the difference voltage will be low indicating the correlation is high. If the undelayed and delayed video signal present different image frames during the frame period they will not match due at least to random noise, then the difference voltage will be higher indicating the correlation is low. This signal is used to determine if the delay is less than a frame or greater than a frame. In the presence of NTSC color subcarrier it is known that the picture period comprises two frames (or four fields), the subcarrier being reversed on the second frame with respect to the first. This allows the correlator to distinguish delays of up to one frame, from delays between one and two frames but can not distinguish delays over two frames from delays less than two frames, since the subcarrier for frame 1 is the same phase as in frame 3.

The circuit described in '135 has difficulty distinguishing the number of frames of delay of the delayed signal once the delay exceeds one unique picture period, since the correlation when anything but a less than one unique picture period signal delay is present is always low. Consequently while the correlation system shown in '135 may distinguish between a partial frame and a one plus partial frame delay, it is unsuitable for example to use to distinguish a delay of 3 frames from a delay of two frames.

U.S. Patent RE. 33,535 reissued Feb. 12, 1991 with an initial issue date of Oct. 27, 1987 shows how to measure relative audio to video delays by use of timing signals encoded on the video, but does not measure relative delay by use of the video itself.

Part of the requirement for matching video and audio is to delay the audio by a changing compensating amount. Older types of audio synchronizers handled the change problem by simply jumping to the new delay value in small steps, but this created pops and clicks. Unfortunately these artifacts lasted for a few seconds up to minutes in extreme instances.

The popping problem was overcome by storing audio in a FIFO type memory and changing the clock speed of the read relative to the write. If audio is read slower than it is written, the delay increases and if it is read faster than it is written then the delay decreased. Unfortunately, reading audio faster or slower creates a pitch change similar to playing a tape recorder back off speed.

Other audio synchronizers controlled pitch artifacts by combinations of limiting the rate of delay change and/or making changes during silence periods. As a consequence of this action, when rapid or instant video delay changes occurred, the audio synchronizer would take several seconds or even minutes to chase the new delay. If the audio program contained music or other continuous audio, this slowed the rate of change so that it could take a few minutes for the audio synchronizer to catch up to the new delay. During that period of time the lip sync would be out by a noticeable amount.

Currently available audio synchronizers such as the Pixel Instruments AD3100 have a pitch correction circuit which makes it capable of making delay changes of over 2 frames in under 0.2 second without any missing audio, pops, clicks or pitch change artifacts. This capability allows extremely fast response to instant changes, keeping audio in sync at all times. These features will find considerable new use in the present invention. In order to utilize these features to their maximum value, it is necessary to quickly determine the delay which a video signal has experienced in passing through a system. This determination must be made in the presence of constantly changing video from different sources, a feature of the present invention.

Additionally, current audio delay devices provide a two wire remote control dump which forces the delay to zero. This feature is used to allow the delay to operate as a profanity censoring device. The audio is delayed before being broadcast, and in the event the operator hears an unacceptable comment he pushes the dump button, thus causing the unacceptable portion of the audio to be discarded before being broadcast. This feature will also be useful in the new application of the present invention.

SUMMARY OF THE INVENTION

The invention described herein provides use of the delay detection set forth in the parent application with additional teachings for use with programs which are generated from multiple audio and video signals and sources and processing.

The invention may be utilized to determine if a particular output image came from a given input source, or which of a plurality of input sources a particular output image was derived from. In addition, the invention may be operated to determine the delay which a particular output image suffered while passing from an input source to the output. The image source information may be coupled to a selector to allow audio or other associated signal selection in response to the determination of the video source, and the image delay information may be utilized to cause one (or more) matching delay to delay audio or other associated signal to match the image delay. The invention will find great usefulness with television video and audio signals.

It was noted in the parent application that while the description of the preferred embodiment pertained to comparing one undelayed image and a plurality of delayed images, it is also possible to compare one delayed image to a plurality of undelayed images, or to compare a plurality of undelayed images to a plurality of delayed images. In particular, it should be noted that while an individual output image may be compared to an individual input image to determine correspondence, by comparing more than one image, for example two or three consecutive images, that the comparison and results may be enhanced in accuracy and reliability. As an example, if the probability of error of false matching in any pair of images is 1%, the probability of error of false matching for any two pairs of sequential images is 1% times 1% or 0.01%.

The present invention is also useful with any sort of time related transmission, storage or conveyance of image information, such as television video, film, holographic recording, light transmission and others as will become apparent to one skilled in the art from the teachings given herein. Furthermore, the present invention is useful with images which are coded, stored, transmitted or carried in any of a number of methods, for example digitized, compressed or various forms of encoding.

DESCRIPTION OF THE PREFERRED EMBODIMENT

Figure 1:
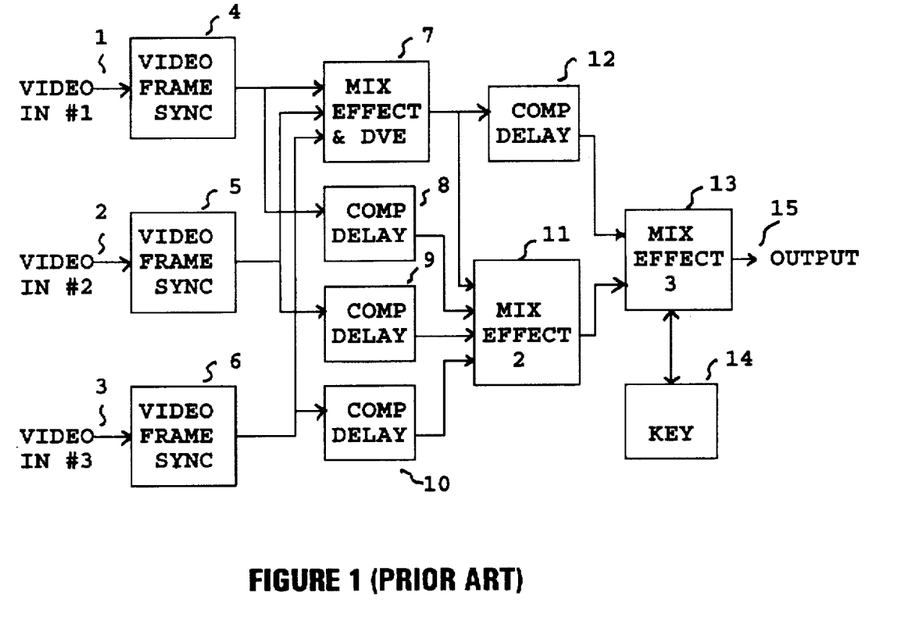
FIG. 1 is a drawing showing a typical prior art video type production system.

FIG. 1 Shows, by way of example, a typical video type production system, commonly known as a switcher, which is used to selectively combine audio and video from various sources to produce a single video program. The video sources are shown as Video inputs 1–3 respectively, each of which is coupled to a corresponding frame synchronizer 4–6. The synchronized video signals are coupled to a mix/effects and digital video effects circuit 7 and to compensating delays 8–10. The outputs of 7–10 are coupled to a further compensating delay 12 and mix/effects circuit 11. The outputs of 11 and 12 are coupled to a third mix/effects circuit 13 which includes a key circuit 14. The output of 13 provides the resultant video program 15 which is composed from the sources 1–3.

FIG. 1 is intended by this example to represent any image processing system which receives one or more electronic input signals and outputs one or more of those electronic signals, the importance of the invention being related to the determination of the delay or fullness of the system, or the determination of which of the inputs is used to create the output, rather than the type of signal which is used. It will be seen that the present invention will find applications for any type of signal for which a correlation or comparison of delayed and undelayed versions may be made.

As the cost of digital video processing decreases it becomes possible to integrate devices such as video frame synchronizers, noise reducers, color correctors, and digital effects to produce high performance and cost effective production switchers and systems. A typical system might look like this block diagram of FIG. 1 with such devices integrated into elements 7, 11 13 and/or 14.

Since many switchers and other image processing systems integrate video frame synchronizers or the like in their inputs, a variable video delay which ranges from almost none to one or more frames is added to the video. In addition, many DVE circuits add an additional delay of one or more frames, and this delay is changed as the DVE is switched in and out of operation. It is not uncommon for these production systems to add variable delays to the video which range from a few hundred microseconds to over 8 frames, depending on the path the video signal takes through the switcher. While these delays are somewhat problematic in the construction of the production switcher or system, they are generally compensated for by compensating delays such as 8–10 and 12 which may be fixed or may be changed in length, switched in and out or otherwise altered to achieve such compensation. Unfortunately, all of this altering and switching of delays seriously hampers the determination of the delay which the video signal output at 15 has experienced at any instant.

Obviously, a delay of 8 frames will create a lip sync problem. Even delays of 1 frame can be noticeable and will detract from the program quality. In order to prevent this problem, the audio program which is associated with the video signal being output from the production system must be delayed to match the video delay.

When a typical video production installation is analyzed, it will often be the case that there is a separate audio source associated with each video input. For example, Video 1 might be a network feed from a Satellite and Video 2 and Video 3 might be from two Video Tape Recorders (VTRs). It is important that as each video feed is passed through the production switcher that its corresponding audio be delayed to match the video delay. This can be accomplished by using a video delay detector such as taught in the parent application to measure the delay and a companion audio synchronizer such as the Pixel Instruments AD2100 or AD3100 audio synchronizer to delay the audio.

Figure 2:
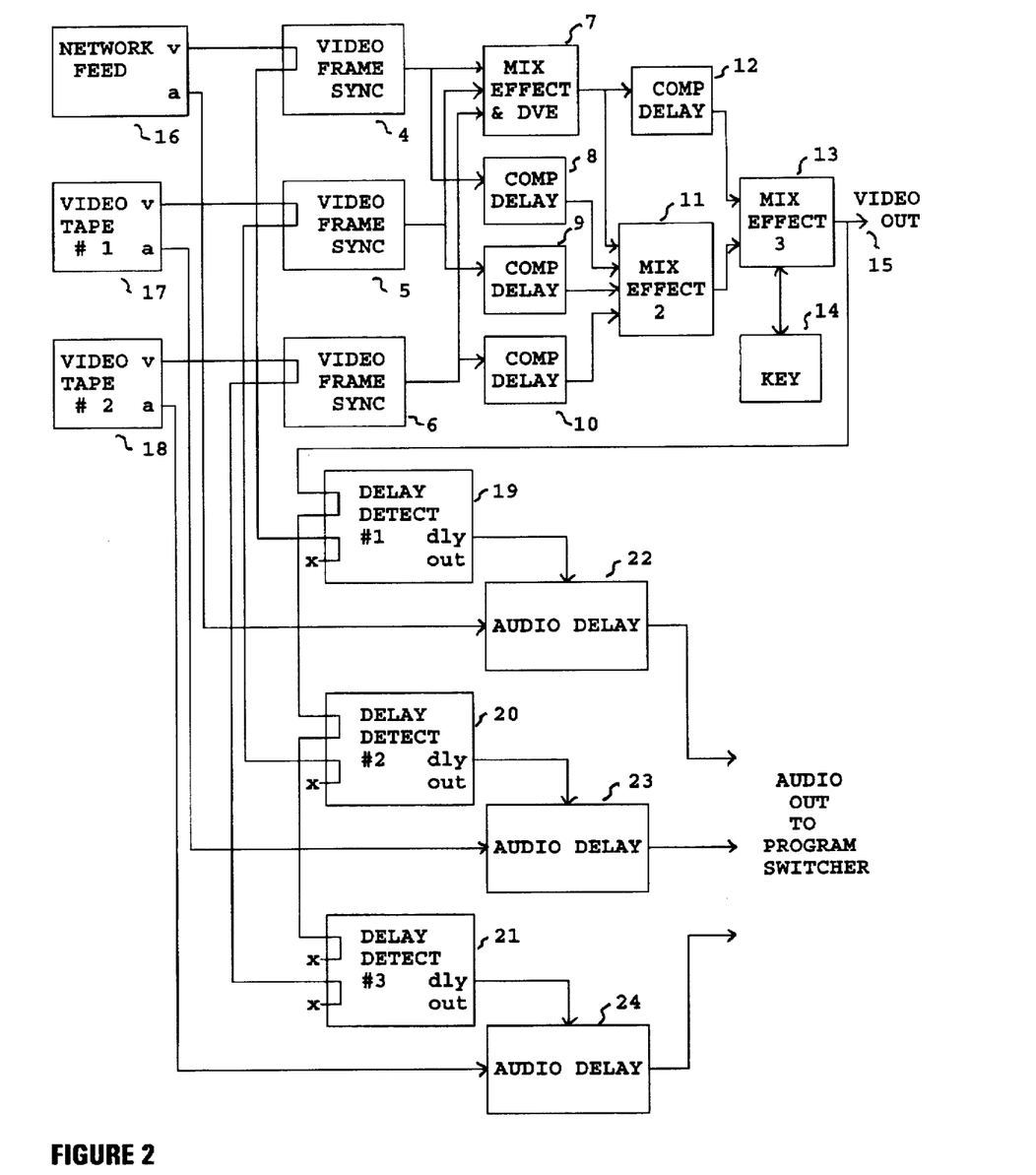
FIG. 2 is a drawing showing the use of the invention with the system of FIG. 1.

FIG. 2 is a diagram of a production system which meets this needs outlined above. As can be seen from FIG. 2, each video input 16–18 is coupled to the undelayed input of a delay detector 19–21 respectively, with the output of the production switcher from 15 coupled to the delayed inputs of all of the delay detectors 19–21. Each delay detector 19–21 can then measure the delay of each respective video signal 16–18 and provide a steering signal to a companion audio delay 22–24. These companion audio delays are often referred to as audio synchronizers since they have the ability to receive an external steering signal and adjust the audio delay in response thereto.

For example, when the network video signal 16 is selected to be output at 15 by the video switcher via 4, 7, 11 and 13, the #1 delay detector 19 will compare the undelayed network video which is input to the switcher via 4 to the delayed network video which is output from the switcher at 15. The delay detector 19 compares the two video signals as taught in the parent application to measure the delay between them. Alternatively, other delay detection methods may be employed. The delay steering pulse from the #1 delay detector 19 then causes the companion audio delay 22 to delay the network audio by a matching amount. The delayed network audio is then passed on to the program switcher where is selected and sent on to the transmitter or recording tape machine.

Similarly, when VTR#1 17 or VTR#2 18 is selected, its corresponding audio is delayed by the proper amount to match the delay of its video through the various route it takes to 15.

The operation of the preferred delay detectors as taught in the parent specification is specifically designed for applications such as these, and has several design enhancements which make it highly desirable for the present use.

When the video delay undergoes an instant change, such as when the DVE 7 is switched in, or when the input video synchronizer 4–6 undergoes a pointer crossing and instant delay change occurs. Instant delay changes, especially pointer crossings in four field synchronizers, can cause instant delay changes up to 66 ms. This large change places a difficult burden on the audio delay since it must acquire the new audio delay value quickly without losing audio, causing pops and clicks or pitch artifacts. The previously suggested preferred audio delay, the Pixel Instruments AD3100 provides pitch shifting capability along with rapid delay change which capabilities are found to be quite useful for the present invention.

If there are video feeds from character generators or other sources when no delay is needed, the prior art dump feature of an audio delay finds a new use in the present invention. The dump control can be coupled to the tally system, or other signal of the switcher to provide the capability of changing the delay to zero for such occurrences.

The delay detector capabilities of the parent application provided for detecting the loss of correlation between delayed and undelayed inputs, and holding the last good delay value upon such loss of correlation until a new correlation was made. This feature was useful for instances where the video was lost, noisy or corrupted on one or the other input, or where the video delaying device interrupted or seriously altered the video signal, for example a frame synchronizer which froze the video. This feature will find considerable use in the new application of the present invention.

It will be recognized in FIG. 2 that most of the time two of the delay detectors 19–21 will not have the same video signal present at the delayed and undelayed inputs and consequently will be unable to determine a valid delay. In this instance, the delay detector recognizes that there is no correlation or correspondence at all between the two video signals, and the delay output is held at the last valid value. The recognition of no correlation or correspondence results in the present invention from the fact that two good but unrelated video signals are being applied, whereas in the previous disclosure the recognition of lack of correlation was intended mainly to take place if one of the video inputs was lost or corrupted.

In the event two unrelated video signals are suddenly presented to the delay detector, this last good value is held until the delay detector senses matching delayed and undelayed video signals again, at which time it again calculates the proper delay. In addition, a status signal provides the information of unmatched video signals as well as other information to other circuits such as will be described below.

If a color corrector, noise reducer or proc amp is switched into the production system to make video corrections it might be anticipated that failure would be caused due to the lack of correlation caused by such devices. It is thus desired that as long as the delayed video signal is reasonably similar to the input video signal, the delay detector correlation be capable of determining and correcting or accommodating these static changes in order to allow proper determination of the delay. Changes to the delayed video such as noise reduction, color correction, hue, saturation, luma gain and luma offset frequently have no negative effect on the correlation capability of the delay detector because of the ability to compensate for such relatively static changes. This is a very useful feature in the present invention. In addition, it is often useful to be able to sample the video images at the same locations on the raster despite scan conversion from one video standard to another. For example in systems where the input video standard is NTSC and the output standard is PAL, it is necessary to adjust the sampling of video so that the samples are taken at the same image location on the raster, despite the fact that that location corresponds to a different scanning line number on the raster. In other words, if a sample is taken 20% from the top and 20% from the left of the raster on the input video, the corresponding output video sample should be taken 20% from the top and 20% from the left of the raster on the output video.

If a key or matte is created in the delayed video, as long as the delayed video signal is similar to the input video signal, it is preferred that the delay detector correlation be capable of determining and correcting or accommodating these static changes in order to allow proper determination of the delay. Normal keying & matting of station logos and titles frequently have no negative effect on the correlation capability of the delay detector of the preferred embodiment described in the parent application.

Other static or slowly changing effects may be accommodated as well, such as happens when the video signal is altered by rotation or other special effects. Effects which spatially alter the video, such as rotations, flips and compression may be detected as gross changes to the video and the last valid delay value before the effect is held by the delay detector until the video returns to its normal state. It might be noted here that such gross changes rarely last for more than a few seconds and the change of video delay during that time is usually quite small. In addition, it is difficult for viewers to detect any lip sync error on video images which have experienced these effects. If however it is desired, additional circuitry may be provided to accommodate these changes by moving the taking of samples of the video to match the spatial positional changes of the video. Such circuitry is preferred to be incorporated in the delay detector between the memory holding the delayed video samples, for example after 23 of FIG. 4 of the parent application, and the correlation circuit. Rotation, perspective and size manipulation of images represented by digital samples is well known in the art, as is the undoing of any such operation. It is preferred that any image manipulation by the switcher, for example by 7, 11 or 13 be coupled to the delay detectors to provide instructions to undo the operation on the delayed video samples before correlation. In the alternative, the undelayed video may be manipulated in order to cause it to match the delayed video. Integrated Circuits such as the Raytheon TMC2302 Image Manipulation sequencer, TMC2330 Coordinate Transformer and TMC2255 Two Dimensional Convolver are capable of performing such functions. Attention is called to the applications notes and specifications for these ICs which are available from Raytheon Corporation of LaJolla, Calif. in this respect, which information is incorporated herein by reference.

It is also desired that the delay detector operate with live camera feeds that are chroma keyed, such as with a weather caster which is chroma keyed over a weather map by use of the Key circuit 14 of FIG. 2. With effects such as chroma keys the delay detector is capable of detecting delays providing a significant portion of the undelayed signal is keyed into the delayed signal. If it is desired to guarantee operation under all key conditions, such as when only a small amount of the undelayed video is keyed into the delayed video, it is suggested to use a switcher mix/effects output, (ME output) or a preview output which is upstream of the chroma keyer as the delayed video input to the delay detector, or to change the sampling area of the image to include as much as the keyed signal as possible.

The use of chroma key type circuits in virtual reality set systems is an excellent example of systems which can utilize the present invention. These systems key the performer into a computer generated set, thus eliminating the costs associated with constructing real sets. The video processing which is necessary to perform this task can cause the performer's image to suffer tens of frames of delays, thus creating gross lip sync problems if left uncorrected.

When the ME or preview output of the switcher is used the delay will normally be substantially the same as the keyed or matted output from 15, however if necessary, a fixed offset can be added to the audio synchronizer to compensate for any delay which the chroma key or matte circuit adds to the video. It will be understood that as used in the present application and claims, phrases and words referring to delayed or output video are intended to include and encompass similar signals having similar delays, as for example a preview signal which is similar to an output signal and has similar delay.

It will be recognized that one delay detector could be used for all the video input signals by detecting which signal is currently being passed through the switcher system and switching that signal to the undelayed input of the delay detector. Of course, as each signal is switched, there is some small time required for the delay detector to measure the new delay, and this time to measure is somewhat undesirable in some applications. Each video signal is asynchronous, and undergoes a unique delay in its frame synchronizer. Consequently, fastest operation is obtained when a delay detector and audio synchronizer are used for each source as shown in FIG. 2. It would also be useful to combine the common delayed signal circuitry of all of the delay detectors, thereby creating a delay detector having one delayed signal input and a plurality of undelayed inputs. For example, a single set of the elements 21–23 of FIG. 4 of the parent application may be shared among a plurality of delay detectors. One of ordinary skill in the art will be able to construct such a device from the teachings herein.

It is also possible to reduce the number of audio synchronizers which are used in the system by detecting which of the delay detectors is active from a status signal provided thereby, and switching the output of the active delay detector to the input of a single audio synchronizer. The audio synchronizer would operate to delay only the output audio signal.

Figure 3:
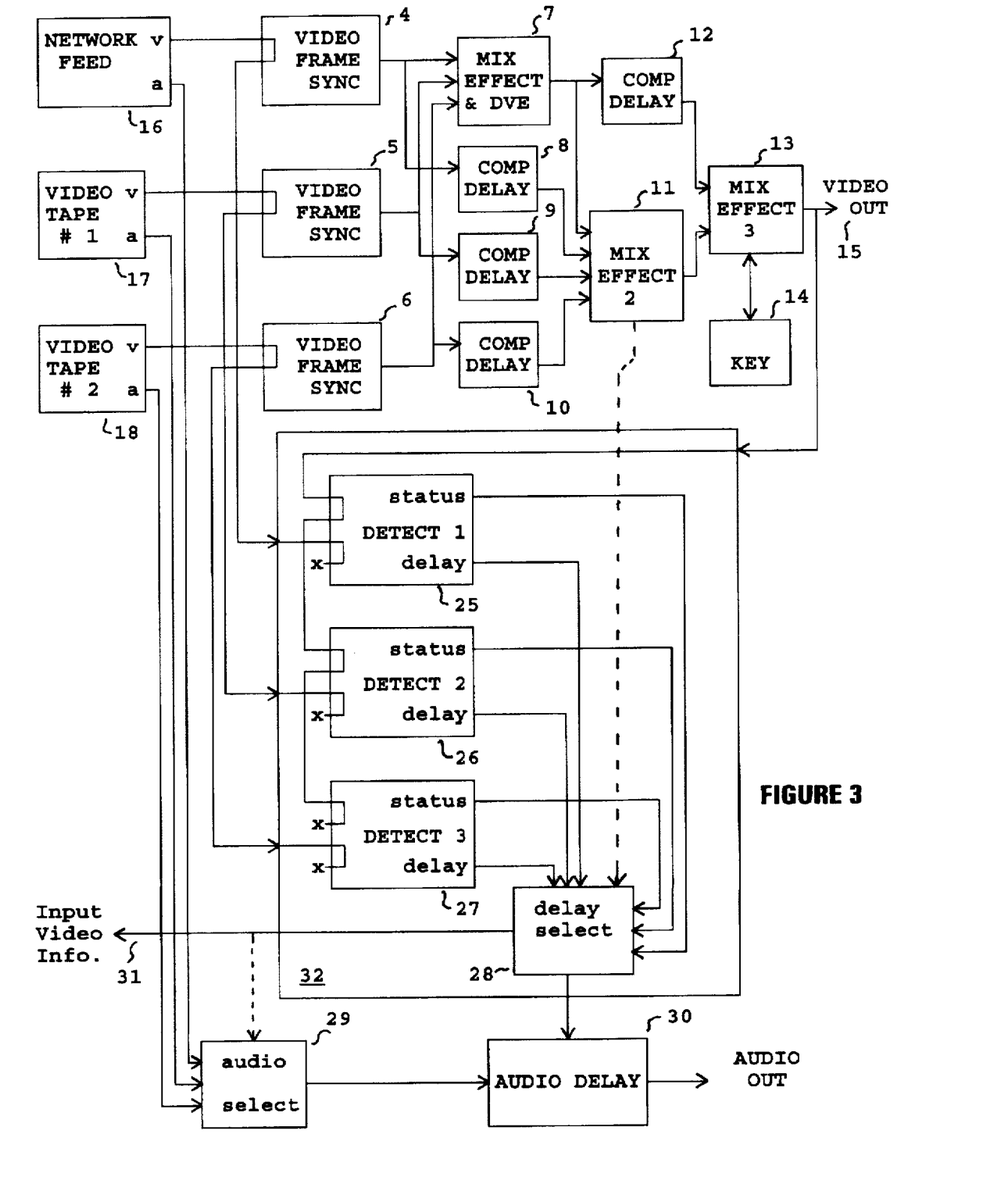
FIG. 3 is a drawing showing the invention as used with the system of FIG. 1 with a single audio delay.

FIG. 3 shows a system in which the elements 4–18 are the same as in FIG. 2, with delay detector 32 comprised of individual elements 25–27 similar to 19–21 of FIG. 2, with the additional elements of an audio select 29 to select the currently used audio signal which is wanted to be utilized for delay by an audio delay 30, and a delay select circuit 28, part of 32, responsive to the status outputs from 25–27 to select the proper delay signal from 25–28 so that the delay signal from the delay detector corresponding to the video signal which is being output from 15 is coupled to the audio delay 30. FIG. 3 also represents a single delay detector which is capable of receiving multiple undelayed video inputs and the delayed video signal and determining the delay and source of the delayed video signal. While each source video signal from 16, 17 and 18 is shown coupled to a separate detector 25, 26, 27 within 32, it will be recognized from the present teachings that a single detector may be coupled to all three sources, operating in time multiplexed fashion to make the appropriate comparisons between the output video frame(s) and the input video frame(s), or by utilizing common delayed video circuitry as previously mentioned. It will of course be possible to configure the invention of the present teachings for operation with any desired number and types of video sources.

When a particular one of video signals from 16–18 is coupled to 15, the delay detector corresponding to that signal will output the current video delay of the signal at 15, as well as a status indication indicating that its delayed and undelayed signals are similar, that is that they may be correlated. The other two delay detectors, having unrelated video signals at their inputs, will output a status indication relating thereto. The delay select switch 28 will operate to couple the proper delay signal from the operating delay detector to the audio delay 30. It is preferred that the status output of each delay detector provide a measure of the correlation or correspondence between the two input signals, thus when two or more input signals are similar and one or both are used to create output signal 15, the delay selector 30 may utilize the information of which correlation is higher to properly select the delay signal.

For example, the output video may consist of a mix of two or more input video signals and delay select 28 will evaluate the status for each input video signal in relation to the others to determine which is most predominant in the output video signal. The delay select is then caused to select the delay of that most predominant signal for use by 30. Alternatively, the delay select 28 may operate to calculate a different delay which is statistically representative of the individual delays of the input signals which make up the output signal. For example, the statistically representative signal could be an average, median or mean of the individual input signal delays.

Furthermore, it is possible to couple a status signal from the switcher to the delay selector to inform the delay selector which video signal(s) are currently being selected to be passed to the output, or alternatively which video signal(s) are not being selected. This status coupling will greatly reduce the task of identifying which video sources are being coupled to the output, at the expense of additional circuitry in the switcher. The addition of this additional circuitry is not trivial, however it will be within the skill of one ordinary skill in the art from the present teachings. This coupling may also indicate when the output may consist of a mix of two or more video signals, and may include information as to the relative amounts of signals which are mixed, allowing delay select 28 will evaluate the status for each video signal in relation to the others to determine which is most predominant in the output video signal as previously taught. Such a status connection is shown by the dashed line from 11 to 28. In instances where this coupling is available, a single delay detector 25 may be utilized with the appropriate video input being selected (not shown) to be coupled to the detector.

It may be noted that in instances where it is desired to determine which one or ones of the plurality of input signals are being coupled to the output, that the delay select 28 may determine and provide this information at output 31 in instances where that information is useful. Such determination may very well be desired in the absence of any switching of delay signals from 25–27 or any accompanying correction of audio by 30.

Other information output at 31 include uses of the invention to monitor the delay of video signals through a processing system as a measure of quality or efficiency or performance. In these instances the signal being input to the system may be correlated with the signal being output from the system, with the delay of the signal through the system being a measure of the fullness thereof. Virtually any signal type may be utilized In such instances, for example video or audio in compressed or uncompressed form. Compressed signals may also be compared to uncompressed signals by appropriate accounting for the signal differences due to the compression.

The output 31 may also be utilized in the selection of the appropriate one(s) of the source audio signals as is shown by the dashed line coupling to 29. Since it is frequently desired that the audio corresponding to the output video 15 also be selected to be output, automatic tracking of the audio selection may be had by this coupling of 29 to the delay select 28.

One example of such applications is in the compression of audio and video signals by JPEG or MPEG compression circuits where as the audio or video signal becomes more complex, the compression takes longer to calculate, causing the filling of a FIFO or other type buffers. It is desired to prevent overflow of the buffer by detecting its degree of fullness, which may be measured by the present delay measurement invention, and adjusting the compression parameters to speed the compression thereby reducing or eliminating the filling of the buffer. The opposite may be detected and compensated when the buffer empties. This application will find considerable interest in the compression and combination of multiple programs which are stored on or transmitted over a limited bandwidth apparatus or channel, such as a satellite transponder. It is desired to keep the total compressed data stream out of the FIFO or buffer just below the transponder data capacity. Consequently the fullness of the buffer needs to be monitored to make sure it neither overflows or underflows.

It will be recognized that when the video output 15 is comprised of a mixture of a plurality of the input signals, the correlation information may be used by 30 to determine which of the input signals is most closely related to the output, and with that information may select the proper delay signal.

In addition when a plurality of signals are combined, the delay select may use the correlation information to determine a new delay value from the delay values which it receives from the delay detector. As an example, consider the situation where a fade is performed from VTR1 to VTR2. The correlation in delay detector 26 will initially be very high and will decrease throughout the fade to a low value. The correlation in delay detector 27 will initially be very low and will increase throughout the fade to a high value. If the delay value from detector 26 is 6 frames, and the delay value from detector 27 is 2 frames, then delay select 28 is preferred to create a new delay signal throughout the fade, which delay signal changes in a linear fashion from 6 frames to 2 frames over the duration of the fade.

Essentially the comparing of samples from the output and input frames may be performed in parallel by multiple devices with one for each input source, or by a single device which is time multiplexed between each input.

When sharing devices, a single device can be utilized to sample all inputs and the output in time multiplexed fashion. For example a first sample from a known location can be taken and stored from each of the video signals as that location presents itself. The first sample is followed by the second, and third, etc. This is possible because the video signals are usually not synchronized where the samples are taken. For example, consider that the vertical sync of the Network feed starts first, followed in 10 μs by the video tape 1 feed, followed in another 150 μs by the video tape 2 feed followed in another 700 μs by the video output. If the first sample is taken from the network feed, the first video tape sample will occur 10 μs thereafter and the video tape 2 sample 150 μs thereafter and so on. It is not necessary that the samples are taken from exactly the same locations on the images, as horizontal or vertical displacements on the raster of a few percent of the raster height or width will still result in highly correlated samples, even if they are taken from different fields. In the case where image samples are taken of some representative image data, for example such as compressed image data or motion vectors, if the samples are taken from the approximately the same location in the matrix or stream of representative data, it will still correlate such that matching images may be performed on this data. As a further example, the same DCT spatial frequency coefficient blocks may be sampled, or may themselves be used as the samples.

If two video signals are in synchronism, it is sufficient to take one shortly before the other. With the speed of currently available video switches and A-D convertors, the two samples can easily be taken within 100 ns of each other, giving excellent spatial correspondence on the images. Alternatively, the second sample can be taken from the line above or below, in the same or different field, with excellent spatial correspondence.

In systems where images which are derived from different sources are selected to be output, an apparatus for determining which of said source which a subsequently output image was derived from may be determined by taking a first set of samples from known locations of one or more images from the first source, taking a second set of samples from known locations, which preferably are the same, of one or more images from the second source with other sets being taken from other sources.

A third set of samples is taken from known locations, which are preferred to be the same, of at least one image from the output. The output samples are compared to the input samples to determine if any of the input sample sets correspond to the output sample set. If no correspondence if found a new set of output samples is taken from another output image, preferably the next sequential output image, and the comparison process is repeated.

It is preferred to determine delays, and input source, by taking a set of samples from an input frame (for each input source), followed by taking a number of sets of output samples from several consecutive frames of the output video, and comparing each set of output samples as they are taken until a match is found. The delay will correspond to the number of output frames which were output until the matching sample set is found. Only the single input sample set (for each input) is required to be stored since the output sample sets may be compared and then discarded as they are output.

It will be recognized from the present teachings that it is also possible to determine delays, and input source, by taking a number of sets of input samples from several frames of the input video (for each input source), taking a set of output samples from a frame of the output video, and then finding which input sample set matches the output set. The delay will correspond to how many input sets back, that is how many input frames were input after the matching input sample set, until the matching output sample set. The delay so determined requires storing all of the input sample sets, since the (matching) input sample set must be stored until it has passed through the system to the output.

The process of taking output samples and comparing them to the input samples is repeated a known number of times, or until a match is found. If the process is repeated the known number of times without a match, the process is started over by taking new samples. It is preferred that the known number of times be sufficient to allow a given input image to pass through the system to the output thus allowing a match when the input image takes the longest path through the system. Thus if the longest path through the system is 14 frames, the process should take 14 output frame sample sets before starting over, or alternatively should take 14 input frame sample sets before taking the output sample set.

It is also possible that the samples may consist of samples of the image in various forms other than in the analog raster form normally used for transmitting images as previously discussed. For example, the images may be in compressed form utilizing JPEG, MPEG, Run Length Encoding, Fractal, Wavelet or any other altered form which is known to one of ordinary skill in the art may be used. In addition, comparisons may be made of characteristic data of the image, such as motion vectors, detail vectors or other computed or calculated data which is related to the image or image characteristics. Since the same or similar image form or characteristic usually exists at the input and output of the video system, it is possible to compare samples of the compressed or otherwise altered image to determine correspondence. The comparisons and correlation of samples may be the same as taught in the parent application and excellent results obtained even though such alternate types of samples are utilized. Consequently, the present inventor intends the words sample, samples, sampling and related words as used within the present specification and claims to encompass the taking or using of any data or other information which is related to or representative of the image content or characteristic.

By way of example, the word sample is intended to include samples are taken from known locations on a raster carrying the image and representing one or more of the luminance, chrominance or chrominance saturation of the image, samples taken from locations of a data file representative of the image, the samples representing a characteristic of the image, samples taken from known locations of a data file representative of a compressed version of a data file of pixels taken from known locations on a raster carrying said image.

While the present invention has been described in the particular form of its preferred embodiment by way of example, it will be understood that the invention disclosed herein may be practiced in other than the preferred embodiment, either by itself or in conjunction with other processing. The invention may be practiced with numerous changes in the arrangement, structure and combination of the individual elements, as well as with substitution of equivalent functions and circuits for the elements in order to optimize the invention for a particular application, all without departing from the scope and spirit of the invention as hereinafter claimed.

What is claimed is:

1. In a system where an image which is derived from one of a plurality of sources is selected to be output, an apparatus for determining if an output image is derived from a given source, said apparatus including in combination:

a) an element for providing samples from at least one image from said given source said samples making up a first set,     b) an element, which may be the same element as in a), for provided at least a second set of samples from at least one image from a second of said sources thereby making up a second set,     c) an element, which may be the same element as element a) or a separate element, for providing samples from at least one image from said output said samples making up a third set, d) an element for determining if said third set corresponds to said first set.

2. An apparatus as claimed in claim 1 including in combination;

e) an element operative such that if said first set is found not to correspond to said third set said second set is compared to said third set, and if said second set is found not to correspond to said third set a fourth set of samples is caused to be provided from a different output image by element d) with said fourth set being compared to said first set and said second set to determine if one corresponds thereto.

3. An apparatus as claimed in claim 1 including in combination;

e) an element operative such that if said first set is found not to correspond to said third set said second set is compared to said third set, and if said second set is found not to correspond to said third set a fourth and fifth set of samples is caused to be provided from different input images by elements a) and b) respectively with said fourth and fifth sets being compared to said third set to determine if one corresponds thereto.

4. In a system where images which are derived from one of a plurality of sources are selected to be output, an apparatus for determining which of said sources a subsequently output image was derived from, said apparatus including in combination:

a) an element for providing at least a first set of samples from at least one image from a first of said sources to provide a first set, b) an element, which may be the same element as element a) or a separate element, for providing at least a second set of samples from at least one image from a second of said sources to provide a second set, c) an element, which may be the same element as element a) or b) or a separate element, for providing at least a third set of samples from at least one image from said output to provide a third set, d) an element for comparing said third set to said first set to determine if said sets of samples correspond, and if no correspondence is found to compare said third set to said second set to determine if said sets of samples correspond, said correspondence, if any, indicating which source said output image was derived from.

5. In a system where images, which are derived from one of a plurality of sources, are selected to be output, an apparatus for determining which of said sources a subsequently output image was derived from, said apparatus including in combination:

a) an element for providing at least a first set of samples from at least one image from a first of said sources to provide a first set, b) an element, which may be the same element as element a) or may be a separate element, for providing at least a second set of samples from at least one image from a second of said sources to provide a second set, c) an element, which may be the same element as element a) or b) or may be a separate element, for providing at least a third set of samples of at least one image from said output to provide a third set, d) an element for comparing said third set to at least said first set and to said second set to determine which, if any, of said first and second sets said third set most closely corresponds, said correspondence indicating which source said output image was derived from.

6. An apparatus as claimed in claim 1, 4 or 5 in which in elements a), b), and c) said samples are taken from substantially the same known locations on the respective images.

7. An apparatus as claimed in claim 1, 4 or 5 including in combination;

e) an element operative to cause element d) to provide subsequent sets of samples from a known number of different output images and compare each said subsequent set to said first and second sets, said subsequent sets being compared as long as no subsequent set is found which corresponds to said first or second sets, with element e) operative such that upon completion of said known number of sets, elements a) through d) are caused to repeat their actions for different respective images.

8. An apparatus as claimed in claim 1, 4 or 5 including in combination;

e) an element operative to cause element d) to provide subsequent sets of samples from a number of different output images and compare said subsequent sets to said first and second sets, f) an element responsive to the number of output sample sets which are compared until one of said subsequent sets is found to correspond to one of said first or second set, said number being a measure of delay said matching one of said first or second set experienced in passing through said system.

9. An apparatus as claimed in claim 1, 4 or 5 wherein said system is a video system having video signal sources and a video signal output, with said images being represented in frames and with said samples being provided by selecting pixels at known locations in the raster, including in combination;

e) an element operative to cause element d) to provide subsequent sets of samples from a number of different output image frames and compare each said subsequent set to said first and second sets, f) an element responsive to the number of output image frames which are output after the corresponding one of said first or second set is provided by element a) or b), said number being a measure of delay said corresponding one of said first or second set experienced in passing through said system.

10. An apparatus as claimed in claim 9 further including a variable delay responsive to f) to provide a compensating delay for a signal associated with said video signal which is output.

11. An apparatus as claimed in claim 4 or 5 including in combination;

e) an element operative such that if neither said first nor said second set is found to correspond to said third set, a fourth set of samples is caused to be provided from a different output image by element d) with said fourth set being compared to said first set and said second set to determine if one corresponds thereto.

12. An apparatus as claimed in claim 4 or 5 including in combination;

e) an element operative such that if neither said first nor said second set is found to correspond to said third set, a fourth and fifth set of samples is caused to be provided from different input images by elements a) and b) with said fourth and fifth sets being compared to said third set to determine if one corresponds thereto.

13. In a system where an image which is derived from one of a plurality of sources is selected to be output, a method for determining if an output image is derived from a given source, said method including the steps of:

15 a) providing at least a first set of samples from at least one image from said given source, b) providing at least a second set of samples from at least one image from a second of said sources, c) providing at least a third set of samples from at least one image from said output, d) determining if said third set of samples corresponds to said first set of samples.

14. The method as claimed in claim 13 including; in step d), also comparing said second set to said third set to determine if they correspond, and e) a further step operative such that if neither said first nor said second set is found to correspond to said third set, a fourth set of samples is caused to be provided from a different output image by step d) with said fourth set being compared to said first set and said second set to determine if one corresponds thereto.

15. The method as claimed in claim 13 including; in step d), also comparing said second set to said third set to determine if they correspond, and e) a further step operative such that if neither said first nor said second set is found to correspond to said third set, a fourth and fifth set of samples is caused to be provided from different input images by steps a) and b) with said fourth and fifth sets being compared to said third set to determine if one corresponds thereto.

16. The invention as claimed in claim 1 or 13 wherein said samples are taken from known locations on a raster carrying said image, said samples representing only one of the luminance, chrominance or chrominance saturation of said image.

17. In a system where images which are derived from one of a plurality of sources are selected to be output, a method for determining which of said sources a subsequently output image was derived from, said method including the steps of:

a) providing at least a first set of samples from at least one image from a first of said sources, b) providing at least a second set of samples from at least one image from a second of said sources, c) providing at least a third set of samples from at least one image from said output, d) comparing said third set of samples to said first set of samples to determine if said sets of samples correspond, and if no correspondence is found to compare said third set of samples to said second set of samples to determine if said sets of samples correspond, said correspondence, if any, indicating which source said output image was derived from.

18. In a system where images, which are derived from one of a plurality of sources, are selected to be output, a method for determining which of said sources a subsequently output image was derived from, said method including the steps of:

a) providing at least a first set of samples from at least one image from a first of said sources, b) providing at least a second set of samples from at least one image from a second of said sources, c) providing at least a third set of samples of at least one image from said output, d) comparing said third set of samples to at least said first set of samples and to said second set of samples to determine which, if any, of said first and second sets said third set most closely corresponds, said correspondence indicating which source said output image was derived from.

19. The method as claimed in claim 13, 17 or 18 in which in steps a), b), and c) said samples are taken from substantially the same known locations on the respective images.

16

20. The method as claimed in claim 13, 17 or 18 including;

e) a further step operative to cause step d) to provide subsequent sets of samples from a known number of different output images and compare each said subsequent set to said first and second sets, said subsequent sets being compared as long as no subsequent set is found which corresponds to said first or second sets, with element e) operative such that upon completion of said known number of sets, steps a) through d) are caused to repeat their actions for different respective images.

21. The method as claimed in claim 13, 17 or 18 including;

e) a further step operative to cause step d) to provide subsequent sets of samples from a number of different output images and compare said subsequent sets to said first and second sets, f) a further step responsive to said number of output sample sets which are compared until one of said subsequent sets is found to correspond to one of said first or second set, said number being a measure of delay said matching one of said first or second set experienced in passing through said system.

22. The method as claimed in claim 13, 17 or 18 wherein said system is a video system having video signal sources and a video signal output, with said images being represented in frames and with said samples being provided by selecting pixels at known locations in the raster, including the further steps;

e) a step operative to cause step d) to provide subsequent sets of samples from a number of different output image frames and compare each said subsequent set to said first and second sets, f) a step responsive to the number of output image frames which are output after the corresponding one of said first or second set is provided by step a) or b), said number being a measure of delay said corresponding one of said first or second set experienced in passing through said system.

23. The method as claimed in claim 22 further including a variable delay step responsive to f) to provide a compensating delay for a signal associated with said video signal which is output.

24. The method as claimed in claim 17 or 18 including;

e) a further step operative such that if neither said first nor said second set is found to correspond to said third set, a fourth set of samples is caused to be provided from a different output image by step d) with said fourth set being compared to said first set and said second set to determine if one corresponds thereto.

25. The method as claimed in claim 17 or 18 including;

e) a further step operative such that if neither said first nor said second set is found to correspond to said third set, a fourth and fifth set of samples is caused to be provided from different input images by steps a) and b) with said fourth and fifth sets being compared to said third set to determine if one corresponds thereto.

26. The method of measuring the delay of a video signal which is output from a video system having a plurality of video signal sources available including the steps of:

receiving a status signal indicative of which said signal source said output video is taken from, said status signal being received from said video system, providing an input set of samples of one or more images from the video signal of the source identified by said status signal, providing an output set of samples for each of a plurality of images of said output video signal, comparing said input set of samples to each of said output set of samples to determine which said output set of samples most closely matches said input set of samples, determining the delay of said most closely matching output set of samples in response to the number of video frames which are output from said system after said input set of samples is taken.

27. The method of measuring the delay of a video signal which is output from a video system having a plurality of video signal sources available including the steps of:

receiving an identification signal indicative of which said signal source said output video is taken from, said identification signal being received from said video system, providing a plurality of input sets of samples of one or more images from the video signal of the source identified by said identification signal, providing an output set of samples for one or more images of said output video signal, comparing each said input sets of samples to said output set of sample s to determine which said input set of samples most closely matches said output set of samples, determining the delay of said output set of samples in response to the number of input video frames which were input to said system before said most closely matching input set of samples was taken.

28. The invention as claimed in claim 1, 4, 5, 13, 17, 18, 21 or 22 wherein said samples are taken from known locations of a data file representative of said image, said samples representing a characteristic of said image.

29. The invention as claimed in claim 1, 4, 5, 13, 17, 18, 21 or 22 wherein said samples are taken from known locations of a data file representative of a compressed version of a data file of samples taken from known locations on a raster carrying said image.

30. The invention as claimed in claim 4, 5, 17, 18, 21 or 22 wherein said samples are taken from known locations on a raster carrying said image, said samples representing one or more of the luminance, chrominance or chrominance saturation of said image.

31. In a system where an image which is derived from one of a plurality of image sources is selected to be output, an apparatus for determining if an output image is derived from a given source, said apparatus including in combination:

a) an element for providing a first set of samples from at least one image from said given source, b) an element, which may be the same element as element a) or a separate element, for providing a second set of samples from at least one image from said output, d) an element for determining if said second set of samples corresponds to said first set of samples.

* * * * *